US012628967B1

(12) United States Patent
Jivani

(10) Patent No.: US 12,628,967 B1
(45) Date of Patent: May 19, 2026

(54) ELEVATED SIDE BED SYSTEM

(71) Applicant: Zamir Jivani, Duluth,, GA (US)

(72) Inventor: Zamir Jivani, Duluth,, GA (US)

( * ) Notice: Subject to any disclaimer, the term of this patent is extended or adjusted under 35 U.S.C. 154(b) by 31 days.

(21) Appl. No.: 18/802,011

(22) Filed: Aug. 13, 2024

(51) Int. Cl.
        *A47D 9/00*          (2006.01)
        *A01K 1/035*        (2006.01)
(52) U.S. Cl.
        CPC ............. *A47D 9/016* (2022.08); *A47D 9/012*
                (2022.08); *A01K 1/0353* (2013.01)
(58) Field of Classification Search
        CPC .. F16B 12/125; F16B 2012/466; A47D 9/016;
                A47D 9/012; A47D 5/00; A47D 9/008;
                A01K 1/0353; A47B 23/02; A47B 81/061
        USPC ............................... 5/95, 659, 312, 658, 691
        See application file for complete search history.

(56) References Cited

U.S. PATENT DOCUMENTS 5,172,435 A    12/1992    Griffin
5,819,340 A    10/1998    Kelly 6,862,757 B2    3/2005    Andriunas
7,584,514 B1    9/2009    Salas
7,886,693 B1 *    2/2011    Salzman .............. A01K 1/0353
                                                                        248/231.71
8,381,333 B2    2/2013    Friedman
2007/0006808 A1    1/2007    Scatchard
2016/0198674 A1    7/2016    Younger
2024/0040991 A1 *    2/2024    Conn ................... A01K 1/0272

FOREIGN PATENT DOCUMENTS

EP            1704799            10/2006

* cited by examiner

*Primary Examiner* — Justin C Mikowski
*Assistant Examiner* — George Samuel Gines

(57)                    ABSTRACT

The elevated side bed system is configured for use with a primary bed structure. The elevated side bed system rests on the primary bed structure. The elevated side bed system includes a supplemental bed structure, a tenon structure, and a pedestal structure. The tenon structure attaches the supplemental bed structure to the pedestal structure. The pedestal structure elevates the supplemental bed structure above the sleeping surface of the primary bed structure. The pedestal structure forms a load path that transfers the load of the supplemental bed structure to the sleeping surface of the primary bed structure. The supplemental bed structure forms an elevated sleeping surface used by an infant or a companion animal.

13 Claims, 5 Drawing Sheets

ELEVATED SIDE BED SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet and infant beds that attach to a larger bed (A47D9/016).

SUMMARY OF INVENTION

The elevated side bed system is configured for use with a primary bed structure. The elevated side bed system rests on the primary bed structure. The elevated side bed system comprises a supplemental bed structure, a tenon structure, and a pedestal structure. The tenon structure attaches the supplemental bed structure to the pedestal structure. The pedestal structure elevates the supplemental bed structure above the sleeping surface of the primary bed structure. The pedestal structure forms a load path that transfers the load of the supplemental bed structure to the sleeping surface of the primary bed structure. The supplemental bed structure forms an elevated sleeping surface used by an infant or a companion animal.

These together with additional objects, features and advantages of the elevated side bed system will be readily apparent to those of ordinary skill in the art upon reading the following detailed description of the presently preferred, but nonetheless illustrative, embodiments when taken in conjunction with the accompanying drawings.

In this respect, before explaining the current embodiments of the elevated side bed system in detail, it is to be understood that the elevated side bed system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the elevated side bed system.

It is therefore important that the claims be regarded as including such equivalent construction insofar as they do not depart from the spirit and scope of the elevated side bed system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
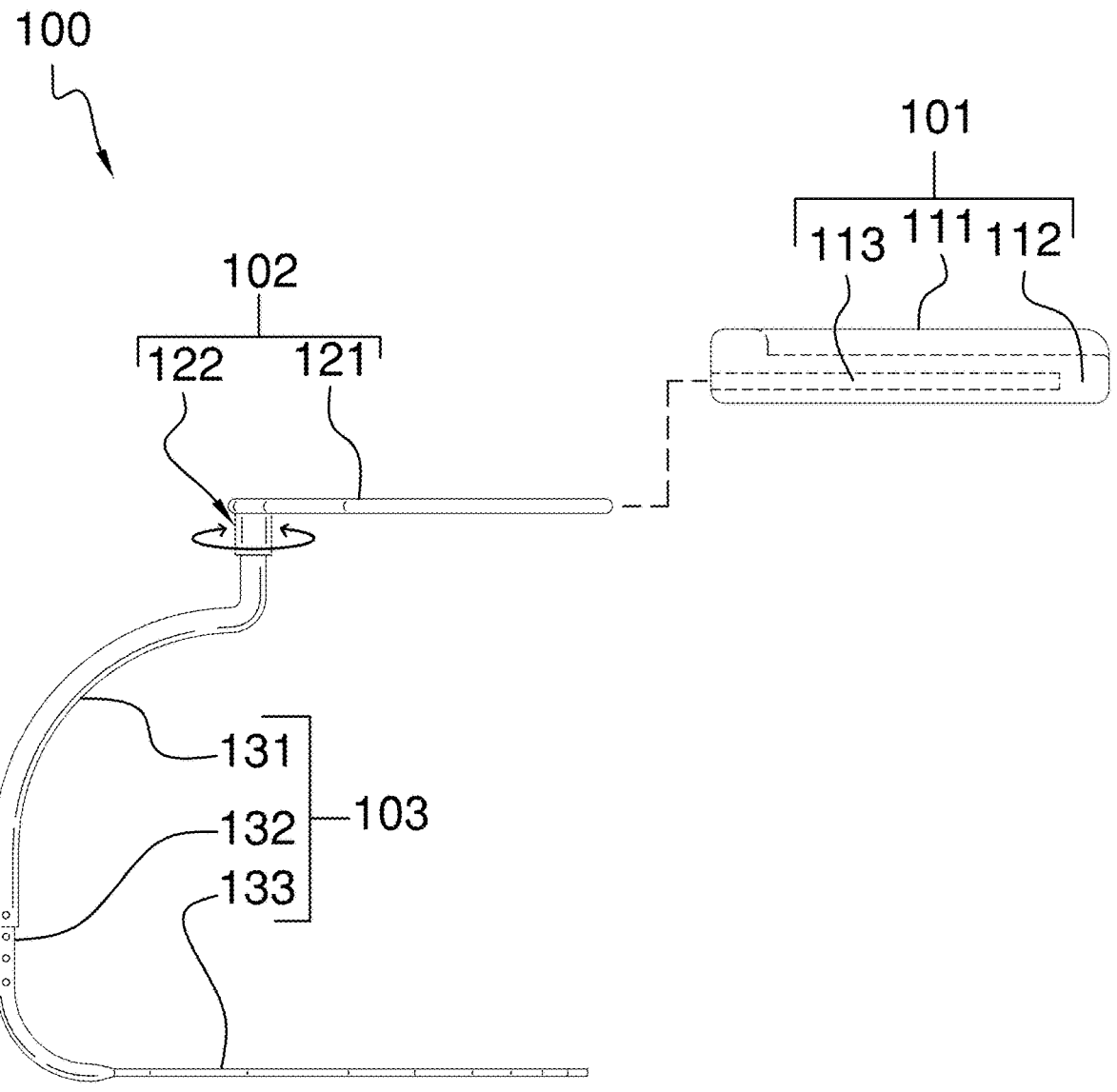
FIG. 1 is a side view of an embodiment of the disclosure.
Figure 2:
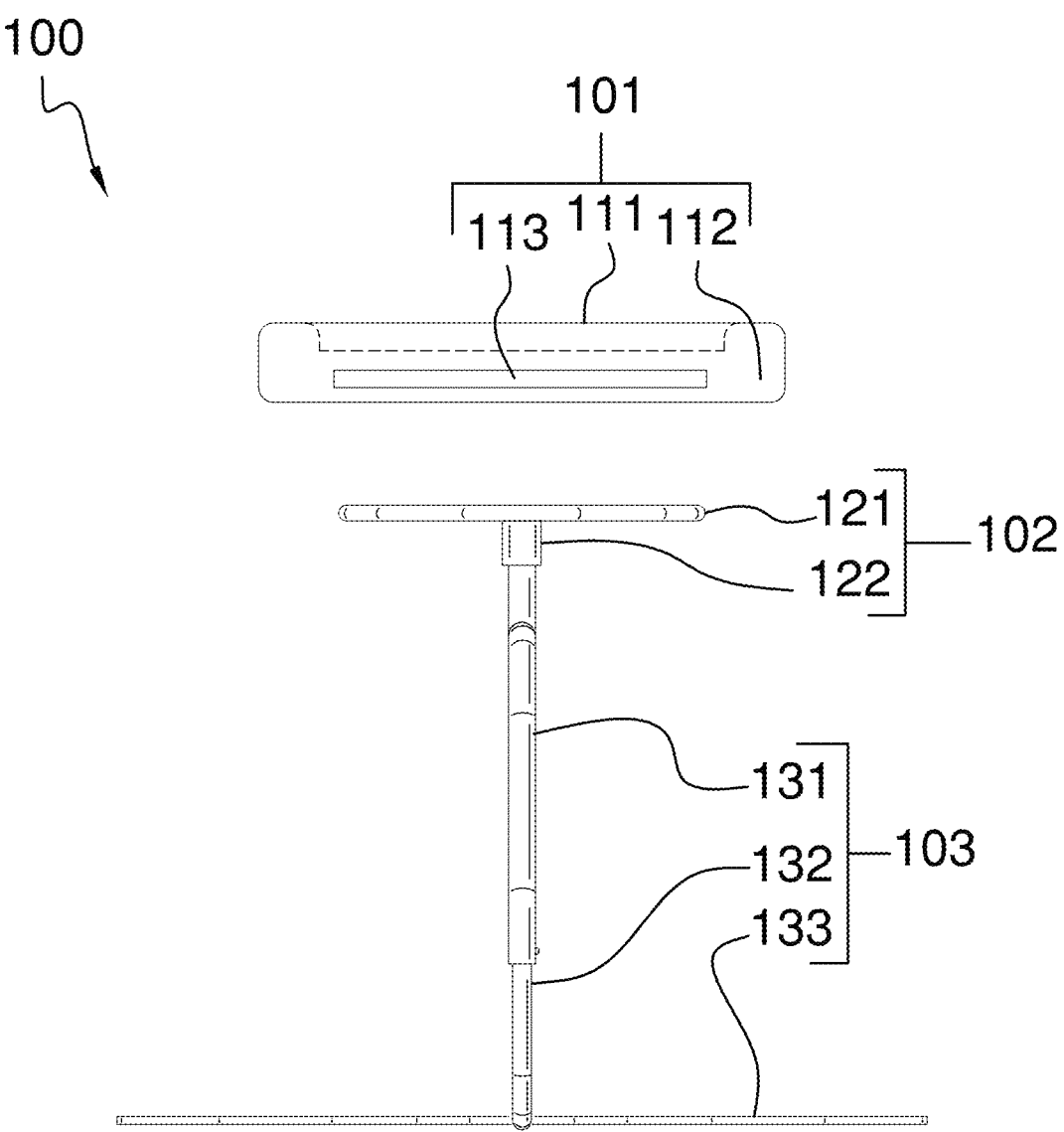
FIG. 2 is a front view of an embodiment of the disclosure.
Figure 3:
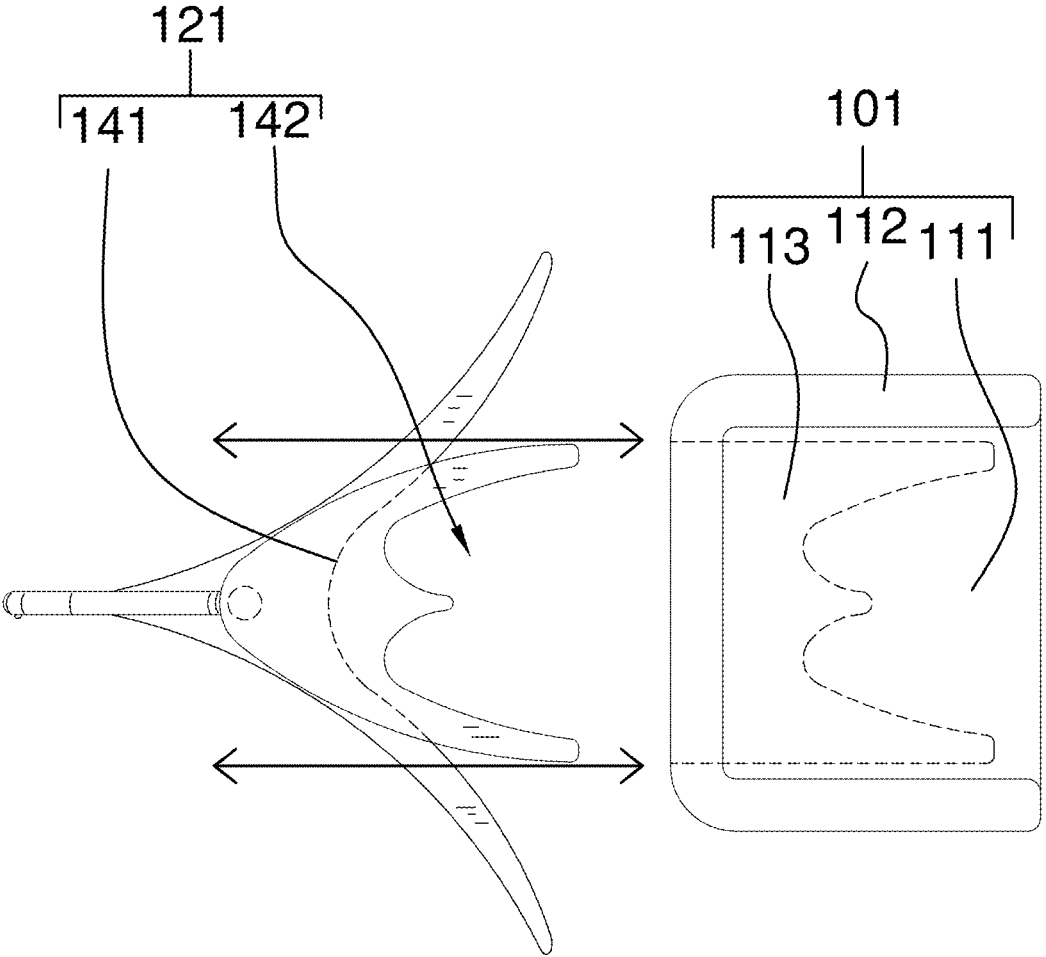
FIG. 3 is a top view of an embodiment of the disclosure.
Figure 4:
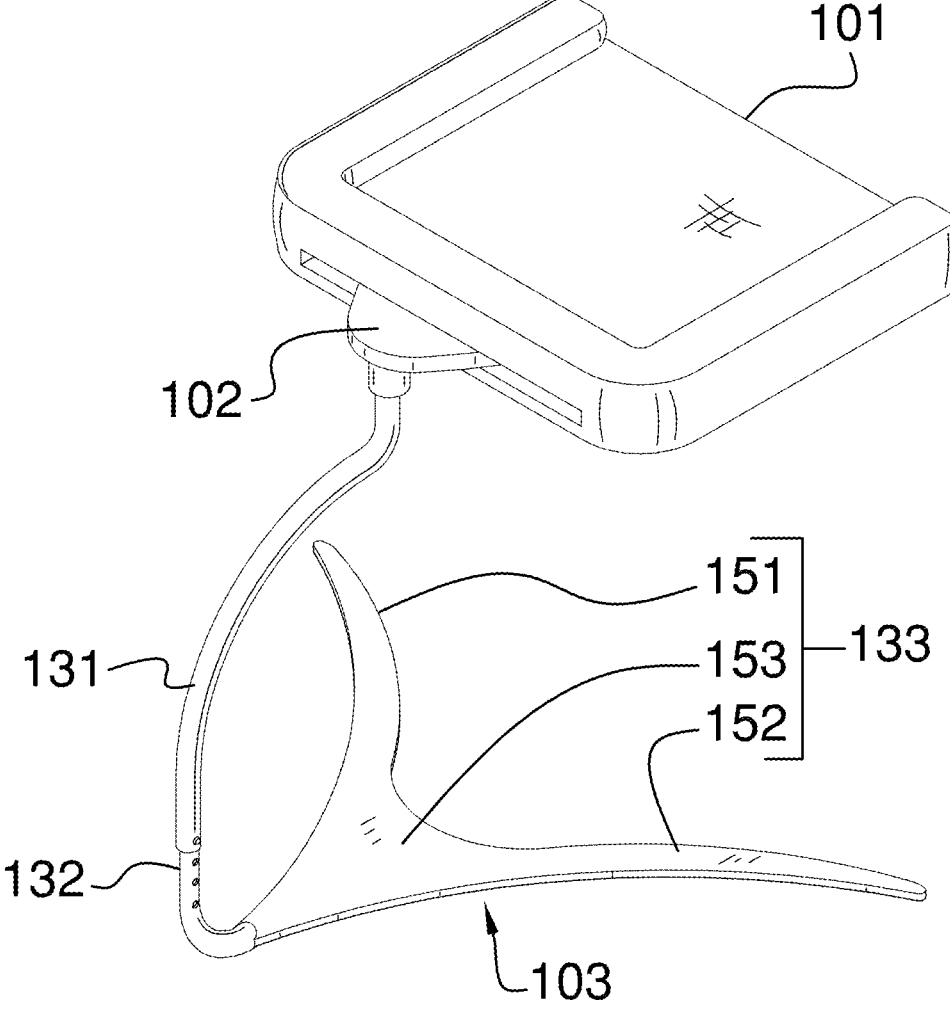
FIG. 4 is a perspective view of an embodiment of the disclosure.
Figure 5:
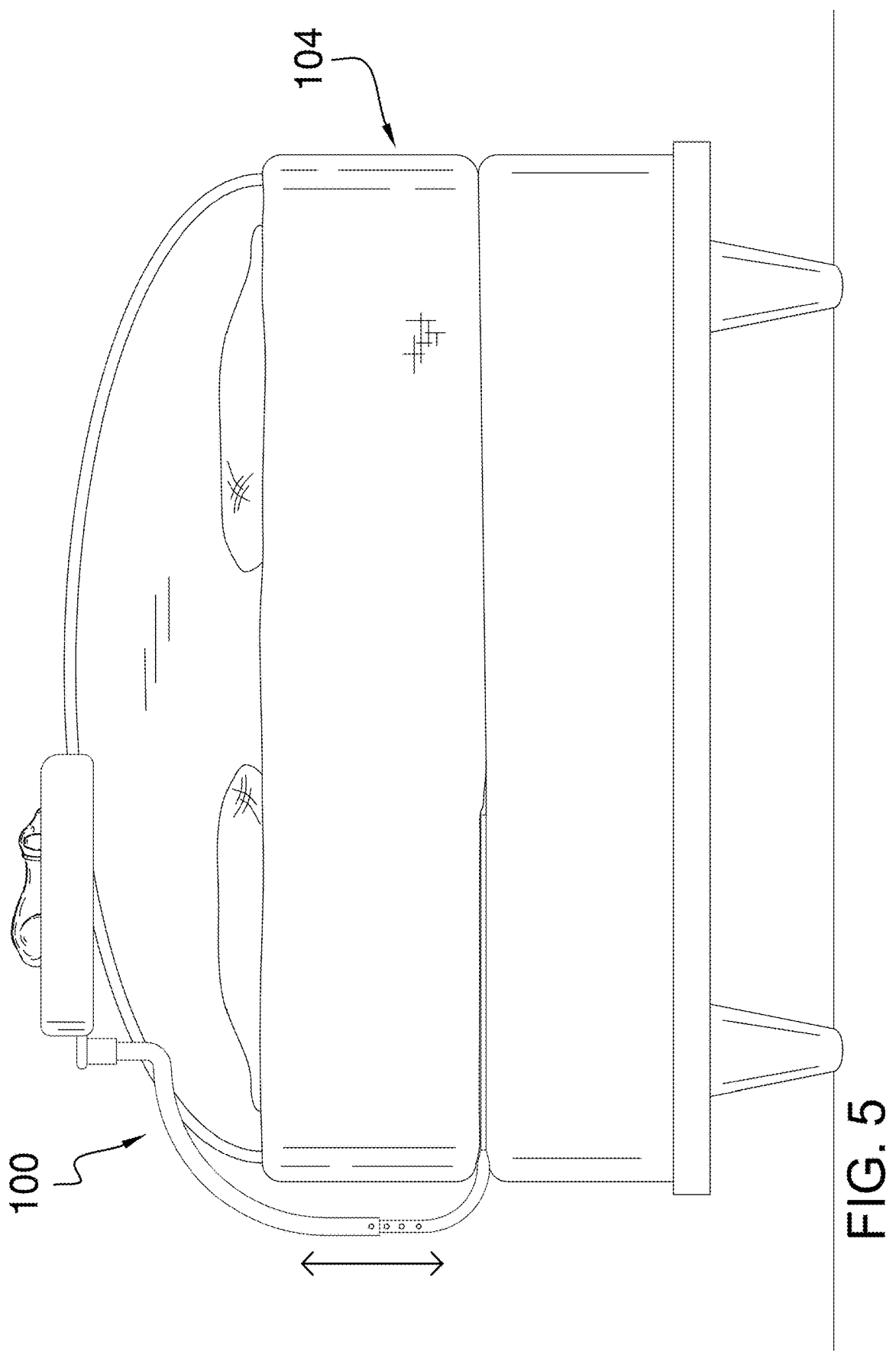
FIG. 5 is an in-use view of an embodiment of the disclosure.

Detailed reference will now be made to one or more potential embodiments of the disclosure, which are illustrated in FIGS. 1 through 5.

The elevated side bed system 100 (hereinafter invention) is configured for use with a primary bed structure 104. The invention 100 rests on the primary bed structure 104. The invention 100 comprises a supplemental bed structure 101, a tenon structure 102, and a pedestal structure 103. The tenon structure 102 attaches the supplemental bed structure 101 to the pedestal structure 103. The pedestal structure 103 elevates the supplemental bed structure 101 above the sleeping surface of the primary bed structure 104. The pedestal structure 103 forms a load path that transfers the load of the supplemental bed structure 101 to the sleeping surface of the primary bed structure 104. The supplemental bed structure 101 forms an elevated sleeping surface used by an infant or a companion animal.

The primary bed structure 104 is a bed. The primary bed structure 104 forms a resting surface.

The supplemental bed structure 101 is a horizontally oriented surface. The supplemental bed structure 101 forms a supplemental resting surface that is elevated above the primary resting surface of the primary bed structure 104. The 8 supplemental bed structure 101 attaches to the tenon structure 102. The load of the supplemental bed structure 101 is transferred to the tenon structure 102. The supplemental bed structure 101 is a rotating structure. The supplemental bed structure 101 rotates around a vertically oriented axis of rotation. The supplemental bed structure 101 rotates relative to the tenon structure 102. The supplemental bed structure 101 comprises a bed mattress structure 111, a bed plate structure 112, and a mortise slot 113.

The bed mattress structure 111 is a cushion. The bed mattress structure 111 forms the supplemental resting surface of the supplemental bed structure 101. The bed mattress structure rests on the superior congruent end of the bed plate structure 112.

The bed plate structure 112 is a disk shaped structure. The bed plate structure 112 is a rigid structure. The bed plate structure 112 is a load bearing structure. The bed plate structure 112 is a horizontally oriented platform. The bed plate structure 112 is elevated above the primary resting surface of the primary bed structure 104 by the tenon structure 102. The bed plate structure 112 forms the structure of the supplemental bed structure 101 that attaches to the tenon structure 102.

The mortise slot 113 is a negative space that is formed in the lateral face of the disk structure of the bed plate structure 112. The mortise slot 113 is a fastening device. The mortise slot 113 is sized such that the tenon structure 102 fits into the mortise slot 113. The tenon structure 102 attaches to the supplemental bed structure 101 by inserting into the mortise slot 113.

The tenon structure 102 is a mechanical device. The tenon structure 102 is a disk shaped structure. The tenon structure 102 is a fastening device. The tenon structure 102 is a load bearing structure. The tenon structure 102 forms a load path that transfers the load of the supplemental bed structure 101 to the pedestal structure 103. The tenon structure 102 attaches to the supplemental bed structure 101 by inserting into the mortise slot 113 of the supplemental bed structure 101. The tenon structure 102 inserts into the mortise slot 113 with a tight fit. The tenon structure 102 comprises an elliptical disk structure 121 and a swivel structure 122.

The elliptical disk structure 121 is a rigid structure. The elliptical disk structure 121 is a disk shaped structure. The elliptical disk structure 121 has a roughly crescent shape. The elliptical disk structure 121 is geometrically similar to the bed plate structure 112 of the supplemental bed structure 101. The elliptical disk structure 121 inserts into the bed plate structure 112 with a tight fit.

The elliptical disk structure 121 comprises an elliptical plate structure 141 and an elliptical negative space structure 142. The elliptical plate structure 141 forms the physical structure of the elliptical disk structure 121. The elliptical negative space structure 142 is a negative space that forms an overlay on the elliptical plate structure 141. The form factor of the elliptical plate structure 141 is based on an ellipse. The elliptical negative space structure 142 is formed from one or more negative spaces that are formed with the form factor of an ellipse. The elliptical negative space structure 142 forms the form factor of the negative space that is subtracted from the full form factor of the ellipse that forms the base structure of the elliptical plate structure 141.

The swivel structure 122 is a mechanical device. The swivel structure 122 is a rotating device. The swivel structure 122 attaches the elliptical disk structure 121 to the pedestal structure 103 such that the elliptical disk structure 121 rotates relative to the pedestal structure 103. The swivel structure 122 is positioned within the structure of the invention 100 such that the axis of rotation of the swivel structure 122 is aligned with the force of gravity.

The pedestal structure 103 is a mechanical structure. The pedestal structure 103 is a disk shaped structure. The pedestal structure 103 is a load bearing structure. The pedestal structure 103 forms the final link of the load path that transfers the load of the invention 100 to the primary bed structure 104. The pedestal structure 103 rests on the primary resting surface of the primary bed structure 104. The pedestal structure 103 comprises a stanchion structure 131, a telescopic structure 132, and a pedestal disk structure 133.

The stanchion structure 131 is a mechanical structure. The stanchion structure 131 is a rigid structure. The stanchion structure 131 is a load bearing structure. The stanchion structure 131 has a composite prism structure. The stanchion structure 131 has a non-Euclidean prism structure. The forms factor of the stanchion structure 131 is selected to place that center of mass of the invention 100 in a position that maximizes the stability of the supplemental bed structure 101. The stanchion structure 131 forms the load path that transfers the loads of the supplemental bed structure 101 and the tenon structure 102 to the telescopic structure 132.

The telescopic structure 132 is a mechanical apparatus. The telescopic structure 132 is a rigid structure. The telescopic structure 132 has a composite prism structure. The telescopic structure 132 is an adjustable structure. By adjustable is meant that the span of the length of the center axis of the telescopic structure 132 is adjustable. The elevation of the supplemental bed structure 101 above the primary resting surface of the primary bed structure 104 adjusts by adjusting the span of the length of the center axis of the telescopic structure 132. The telescopic structure 132 is a load bearing structure. The telescopic structure 132 forms a load path that transfers the load of the stanchion structure 131 to the pedestal disk structure 133.

The pedestal disk structure 133 is a disk shaped structure. The pedestal disk structure 133 is a rigid structure. The pedestal disk structure 133 is a load bearing structure. The pedestal disk structure 133 forms the inferior structure of the invention 100. The pedestal disk structure 133 is the structure of the invention 100 that rests on the primary resting surface of the primary bed structure 104. The pedestal disk structure 133 transfers the load of the invention 100 to the primary resting surface of the primary bed structure 104. The pedestal disk structure 133 comprises a first hyperbolic arm 151, a second hyperbolic arm 152, and a ballast plate 153.

The first hyperbolic arm 151 is an irregular disk shaped structure. The first hyperbolic arm 151 has a non-Euclidean structure. The first hyperbolic arm 151 is a rigid structure. The first hyperbolic arm 151 attaches to the ballast plate 153 to form a lateral disk structure. The physical structure of the congruent ends of the first hyperbolic arm 151 is formed with a curvature.

The second hyperbolic arm 152 is an irregular disk shaped structure. The second hyperbolic arm 152 has a non-Euclidean structure. The second hyperbolic arm 152 is a rigid structure. The second hyperbolic arm 152 attaches to the ballast plate 153 to form a lateral disk structure. The physical structure of the congruent ends of the second hyperbolic arm 152 is formed with a curvature. The curvature of the second hyperbolic arm 152 forms a symmetry with the first hyperbolic arm 151 such that the structure formed by the second hyperbolic arm 152 and the first hyperbolic arm 151 roughly forms the curvature of a hyperbola.

The ballast plate 153 is an irregular disk shaped structure. The ballast plate 153 has a non-Euclidean structure. The ballast plate 153 is a rigid structure. The telescopic structure 132 attaches to the ballast plate 153 of the pedestal disk structure 133 such that the center axis of the telescopic structure 132 projects perpendicularly away from the superior congruent end of the disk structure of the ballast plate 153.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bed: As used in this disclosure, a bed refers to a structure, typically a furniture item, used for sleeping or resting. When the structure is a furniture item, the bed comprises a frame and a mattress. The frame is a pedestal that elevates the mattress. A bed often further comprises one or more box frames. The one or more box frames are mechanical structures that form secondary pedestals that elevate the mattress above the frame. A bed often further comprises a headboard. The headboard is a decorative element that forms a protective barrier between the bed and a wall the bed is placed next to.

Bridge: As used in this disclosure, a bridge refers to a load bearing structure that attaches a first object and to a second object such that a load bearing path is formed between the first object and the second object. The verb "to bridge" means to establish a connection (or remove a disconnection) between a first object and a second object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Companion Animal: As used in this disclosure, a companion animal is a domesticated animal that is maintained primarily for companionship. A companion animal is often referred to as a pet.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Crescent: As used in this disclosure, a crescent is a two edged geometric shape formed from the overlapping of a second circle over a first circle. The diameter of the first circle and the diameter of the second circle may or may not be identical. The first circle and the second circle may or May not share a common center point. The crescent is formed by: 1) overlaying the second circle on the first circle such that two points of intersection are formed; 2) using the second circle as a negative space that removes the area and segment of the circumference of the first circle that is contained within the second circle, and 3) replacing the removed circumference of the first circle with the segment of the circumference of the second circle contained within the area of the first circle to form the second edge of the crescent. Within the scope of this definition an ellipse may be substituted for either (or both) of the first circle and the second circle to form an elliptical crescent. Further, within the scope of this definition either (or both) of the two intersection points may be rounded.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Ellipse: As used in this disclosure, an ellipse is a curve described by the equation $(x/a)^2 + (y/b)^2 = c$. When $a = b$, the ellipse forms a circle.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Extensible: As used in this disclosure, extensible is an adjective that describes an object made of sections that fit or together such that the object can be made longer or shorter by adjusting the relative positions of the sections.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyperbola: As used in this disclosure, a hyperbola is a function that forms two branches when graphed in a plane. The equation of a hyperbola is $(x/a)^2-(y/b)^2=1$. The hyperbola is a conic section.

Infant: As used in this disclosure, an infant refers to a human child who: 1) is under 18 months old; and, 2) has not yet learned to walk.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Lateral Disk Structure: As used in this disclosure, a lateral plate structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mattress: As used in this disclosure, a mattress is a disk-shaped structure that forms a cushion used by a patient when lying flat. The superior congruent end of the disk structure of the mattress forms a horizontally oriented surface.

Mortise: As used in this disclosure, a mortise is a prism-shaped negative space formed in an object that is designed to receive a geometrically similar object referred to as a tenon.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the 8 absolute minimum distance between the same two points. In many 9 geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the center axis of the composite prism structure can be made longer or shorter by adjusting the relative positions of the hollow prism-shaped sections.

Tenon: As used in this disclosure, a tenon is a prism-shaped structure that fits into a mortise such that the tenon is secured to the mortise. The tenon is geometrically similar to the mortise.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An elevated side bed system comprising a supplemental bed structure, a tenon structure, and a pedestal structure;

wherein the tenon structure attaches the supplemental bed structure to the pedestal structure;

wherein the pedestal structure elevates the supplemental bed structure;

wherein the pedestal structure forms a load path that transfers the load of the supplemental bed structure to a supporting surface;

wherein the tenon structure comprises an elliptical disk structure and a swivel structure;

wherein the swivel structure attaches the elliptical disk structure to the pedestal structure;

wherein the elliptical disk structure is a rigid structure that has a crescent shape;

wherein the elliptical disk structure is geometrically similar to the bed plate structure of the supplemental bed structure;

wherein the elliptical disk structure inserts into the bed plate structure with a tight fit;

wherein the swivel structure attaches the elliptical disk structure to the pedestal structure such that the elliptical disk structure rotates relative to the pedestal structure such that the supplemental bed structure is optionally positioned above a primary bed structure;

wherein the swivel structure is positioned within the structure of the elevated side bed system such that the axis of rotation of the swivel structure is aligned with the force of gravity.

2. The elevated side bed system according to claim 1 wherein the supplemental bed structure is a rotating structure;

wherein the supplemental bed structure rotates around a vertically oriented axis of rotation;

wherein the supplemental bed structure rotates relative to the tenon structure.

3. The elevated side bed system according to claim 2 wherein the tenon structure is a mechanical device;

wherein the tenon structure is a disk shaped structure;

wherein the tenon structure is a fastening device;

wherein the tenon structure is a load bearing structure;

wherein the tenon structure forms a load path that transfers the load of the supplemental bed structure to the pedestal structure.

4. The elevated side bed system according to claim 3 wherein the pedestal structure is a mechanical structure;

wherein the pedestal structure is a disk shaped structure;

wherein the pedestal structure is a load bearing structure.

5. The elevated side bed system according to claim 4 wherein the supplemental bed structure comprises a bed mattress structure, a bed plate structure, and a mortise slot;

wherein the bed mattress structure mounts on the bed plate structure;

wherein the mortise slot is formed in the bed plate structure.

6. The elevated side bed system according to claim 5 wherein the tenon structure attaches to the supplemental bed structure by inserting into the mortise slot of the supplemental bed structure;

wherein the tenon structure inserts into the mortise slot with a tight fit.

7. The elevated side bed system according to claim 6 wherein the pedestal structure comprises a stanchion structure, a telescopic structure, and a pedestal disk structure;

wherein the telescopic structure attaches the stanchion structure to the pedestal disk structure.

8. The elevated side bed system according to claim 7 wherein the bed mattress structure is a cushion;

wherein the bed mattress structure forms the supplemental resting surface of the supplemental bed structure;

wherein the bed mattress structure rests on the superior congruent end of the bed plate structure;

wherein the bed plate structure is a disk shaped structure;

wherein the bed plate structure is a rigid structure;

wherein the bed plate structure is a load bearing structure;

wherein the bed plate structure is a horizontally oriented platform;

wherein the bed plate structure is elevated by the tenon structure.

9. The elevated side bed system according to claim 8 wherein the mortise slot is a negative space that is formed in the lateral face of the disk structure of the bed plate structure;

wherein the mortise slot is a fastening device;

wherein the mortise slot is sized such that the tenon structure fits into the mortise slot.

10. The elevated side bed system according to claim 9 wherein the swivel structure is a mechanical device; wherein the swivel structure is a rotating device.

11. The elevated side bed system according to claim 10 wherein the stanchion structure is a mechanical structure; wherein the stanchion structure is a rigid structure; wherein the stanchion structure is a load bearing structure; wherein the stanchion structure has a composite structure; wherein the stanchion structure has a non-Euclidean structure; wherein the stanchion structure forms the load path that transfers the loads of the supplemental bed structure and the tenon structure to the telescopic structure.

12. The elevated side bed system according to claim 11 wherein the telescopic structure is a mechanical apparatus; wherein the telescopic structure is a rigid structure;

wherein the telescopic structure has a composite structure; wherein the telescopic structure is an adjustable structure; wherein by adjustable is meant that the span of the length of the center axis of the telescopic structure is adjustable; wherein the telescopic structure is a load bearing structure; wherein the telescopic structure forms a load path that transfers the load of the stanchion structure to the pedestal disk structure.

13. The elevated side bed system according to claim 12 wherein the pedestal disk structure is a disk shaped structure; wherein the pedestal disk structure is a rigid structure; wherein the pedestal disk structure is a load bearing structure; wherein the pedestal disk structure forms the inferior structure of the elevated side bed system.

* * * * *